United States Patent [19]

Matsuo

[11] Patent Number: 4,549,074
[45] Date of Patent: Oct. 22, 1985

[54] TEMPERATURE CONTROLLER FOR PROVIDING A RAPID INITIAL HEATING CYCLE USING A VARIABLE REFERENCE VOLTAGE

[76] Inventor: Katsuharu Matsuo, 1-10-20, Jiryo, Nishibiwajima-cho, Nishikasugai-gun, Aichi-ken, Japan

[21] Appl. No.: 513,289

[22] Filed: Jul. 13, 1983

[30] Foreign Application Priority Data

Jul. 16, 1982 [JP] Japan ................................. 57-124794
Jul. 27, 1982 [JP] Japan ................................. 57-130854

[51] Int. Cl.$^4$ ............................................. H05B 1/02
[52] U.S. Cl. ..................... 219/505; 219/501; 219/497; 219/212; 323/297; 307/356
[58] Field of Search ............... 219/212, 202, 203, 492, 219/497, 499, 501, 505, 508–510; 323/297, 298; 307/356

[56] References Cited

U.S. PATENT DOCUMENTS 3,509,322  4/1970  Lundin ................................. 219/501
4,031,352  6/1977  Oosterberg .......................... 219/497
4,214,151  7/1980  Kicherer et al. .................... 219/492
4,243,875  1/1981  Chang ................................. 219/497
4,391,237  7/1983  Abe et al. ........................... 219/497
4,485,296 11/1984  Ueda et al. .......................... 219/497

FOREIGN PATENT DOCUMENTS

1055644  1/1967  United Kingdom ............... 219/494

Primary Examiner—M. H. Paschall
Attorney, Agent, or Firm—J. R. Longacre; Glenn J. Perry

[57] ABSTRACT

A temperature controller applied to flat heating equipment, such as an electric blanket, is disclosed wherein power supply control to a heater wire in the blanket is performed, using a predetermined temperature as a target temperature which is corrected to be higher than a desired temperature preset by a user, in an initial period after the electric blanket is started. Power supply to the heater wire is temporarily increased, thereby rapidly warming the blanket, which has a low heat conductivity, and shortening the time interval until the blanket is heated to the desired temperature.

14 Claims, 24 Drawing Figures

FIG. 8F

TEMPERATURE CONTROLLER FOR PROVIDING A RAPID INITIAL HEATING CYCLE USING A VARIABLE REFERENCE VOLTAGE

BACKGROUND OF THE INVENTION

The present invention relates generally to a temperature control apparatus and, more particularly, to a temperature controller for controlling a heater of home heating equipment such as an electric blanket and an electric carpet in response to a detection signal from a temperature sensor arranged together with the heater in the electric blanket or carpet.

Recently, home electric heating equipment such as an electric blanket or carpet having an electric heater has been widely used in homes so as to conveniently heat and/or keep a user warm. In general, a heat-retaining member used in an electric blanket or carpet has low heat conductivity. Therefore, the temperature of the heat-retaining member will not easily rise while the home heating equipment is in use (i.e., for a predetermined time interval after the heater is turned on). In particular, when room temperature is low in the winter time, a considerable time interval is required until the equipment reaches a steady (target) temperature after the equipment is energized. In other words, with the conventional electric carpet or blanket, the transition period until the desired temperature is reached is quite long. As a result, the user feels cold in the room during this transition period, resulting in inconvenience.

SUMMARY OF THE INVENTION

It is an object of the present invention to provide a new and improved temperature controller for suitably controlling an electric heater which is built into a heat-retaining member of an electric blanket or carpet so as to heat the heat-retaining member to a steady temperature in a short period of time, as compared with the operation of a conventional temperature controller.

According to the present invention, the temperature controller is preferably applied to flat heating equipment which includes a flat heat-retaining member such as in blankets and carpet bodies. A heater wire is disposed inside the heat-retaining member, and a sensor wire is arranged inside the heat-retaining member to generate heater temperature data corresponding to the temperature of the heater wire. The temperature controller for flat equipment comprises: first circuit means for selectively generating first data representing a first temperature corresponding to a target temperature of a heat-retaining member and second data representing a second temperature which is higher than the first temperature, said target temperature being preset by an operator; second circuit means, connected to a sensor wire, for generating a temperature detection signal having a signal level corresponding to heater temperature data; third circuit means, connected to said first and second circuit means, for comparing the detection signal with one of the first and second data as reference temperature data, and for preventing power supply to a heater wire when the signal level of the temperature detection signal exceeds a level of the reference temperature data; and fourth circuit means, connected to said first and second circuit means, for controlling said first circuit means so as to continuously generate the first data after said first circuit means has generated the second data and the signal level of the detection signal has reached a level corresponding to the second temperature in an initial period after said flat heating equipment is started.

BRIEF DESCRIPTION OF THE DRAWINGS

The present invention can best be understood by reference to the accompanying drawings, in which.

DETAILED DESCRIPTION OF THE PREFERRED EMBODIMENTS

Figure 1:
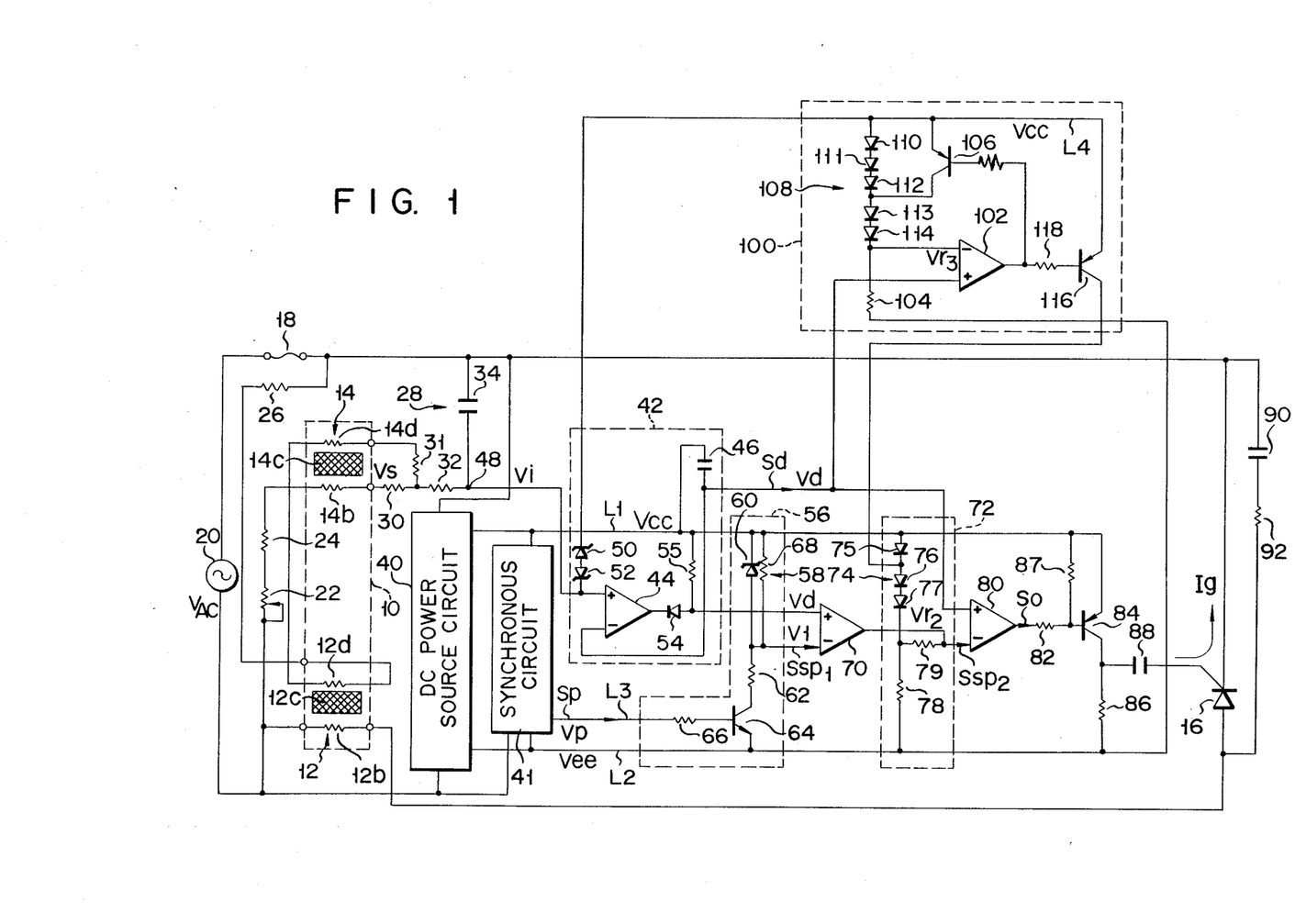
FIG. 1 is a circuit diagram of an electric blanket according to a first embodiment of the present invention.
Figure 2:
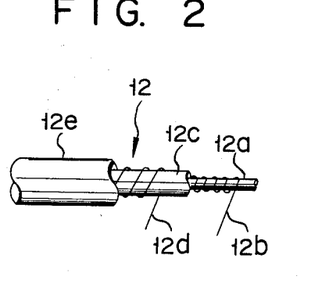
FIGS. 2 and 3 are views each showing the arrangements of a heater wire and a sensor wire provided inside the blanket shown in FIG. 1.
Figure 3:
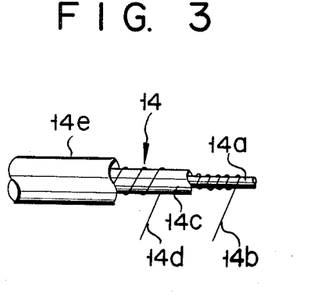

Referring now to FIG. 1, the overall circuit configuration of an item of home heating equipment such as an electric blanket having a temperature controller of a first embodiment of the present invention is illustrated. A blanket body 10 has a heater wire 12 and a sensor wire 14 serving as a heater temperature detecting device. As shown in FIG. 2, the heater wire 12 has a core 12a, a heating line 12b helically wound around the core 12a, and a nylon layer 12c which is coated around the core 12a having the heating line 12b thereon, and which melts at a predetermined temperature. An overheating sensor line 12d is wound around the nylon layer 12c. The resultant structure is coated by an electrically insulating material 12e. As shown in FIG. 3, the sensor wire 14 comprises a core 14a, a first conductor 14b wound around the core 14a, a heat-sensitive layer 14c coated on the core 14a and having an impedance characteristic of a negative temperature coefficient, a second conductor 14d wound around the heat-sensitive layer 14c, and an electrically insulating material 14e coated to cover the resultant structure.

Referring to FIG. 1, the heating line 12b of the heater wire 12, a thyristor 16 serving as a switching element, and a fuse 18 are connected in series with an AC power source 20. A preset temperature variable resistor 22 and a fixed resistor 24 are sequentially connected in series with the AC power source 20 through the impedance of the heat-sensitive layer 14c of the sensor wire 14, the overheating sensor line 12d, a fuse heater 26 for heating the fuse 18, and the fuse 18. The first and second conductors 14b and 14d of the sensor wire 14 are connected to a voltage divider 28 which includes resistors 30, 31 and 32 and a capacitor 34.

A DC power source circuit 40, which includes a zener diode, a diode, a capacitor and the like (these are not illustrated) which are arranged in a known manner, produces a predetermined DC voltage. A synchronous circuit 41 is arranged in a post stage of the DC power source circuit 40. High and low potentials Vcc and Vee generated by the DC power source circuit 40 are supplied to lines L1 and L2, respectively. The temperature detector 42 is connected to the output terminal of the voltage divider 28, and includes an operational amplifier (or differential amplifier) 44 which has an inverting input terminal connected to the line L1 through a capacitor 46, and a non-inverting input terminal connected to a common junction 48 between the resistor 32 and the capacitor 34 and also connected to the line L1 through two zener diodes 50 and 52. The output terminal of the operational amplifier 44 is connected to the line L1 through a diode 54 and a resistor 55. A sampling gate circuit 56 is connected to the synchronous circuit 41. The circuit 56 includes a first reference voltage generator 58 formed of a zener diode 60. The zener diode 60 has its cathode connected to the line L1 and its anode connected to the line L2 through a resistor 62 and an npn transistor 64 whose base is connected to the synchronous circuit 41 through a resistor 66. A resistor 68 is connected in parallel with the zener diode 60. An open-collector type operational amplifier 70 serving as a first comparison controller is provided at the post stage of the gate circuit 56. The inverting input terminal of the amplifier 70 is connected to the anode of the zener diode 60, while the non-inverting input terminal thereof is connected through the diode 54 to the output terminal of the amplifier 44 included in the temperature detector 42. The output terminal of this amplifier 70 is connected to another sampling gate circuit 72 which includes a second reference voltage generator 74 formed of three diodes 75 to 77, and two resistors 78 and 79. In this circuit 72, the second reference voltage generator 74 having the diodes 75 to 77, each of which has a contact potential (or barrier potential) drop (about 0.7 V in the case of a silicon diode), and the resistor 78 are connected between the lines L1 and L2. This gate circuit 72 is connected to an operational amplifier 80 having an inverting input terminal connected to the output terminal of the aforesaid amplifier 70 and to the second reference voltage generator 74 through the resistor 79, and a non-inverting input terminal directly connected to the inverting input terminal of the operational amplifier 44 included in the temperature detector 42. The output terminal of the operational amplifier 80 is connected through a resistor 82 to the base of an ignition control pnp transistor 84. The transistor 84 has its emitter connected to the line L1 and its collector connected to the line L2 through a resistor 86. A resistor 87 is connected between the base and emitter of the transistor 84. The collector of the transistor 84 is connected to the thyristor 16 through an ignition capacitor 88. A noise preventive series circuit, which is formed by a capacitor 90 and a resistor 92, is connected in parallel with the thyristor 16.

A reference temperature adjusting circuit 100 is provided to include therein an operational amplifier 102 having an inverting input terminal connected to the line L2 through a resistor 104, and a non-inverting input terminal directly connected to both the inverting input terminal of the amplifier 44 and the non-inverting input terminal of the amplifier 80. The output terminal of the amplifier 102 is connected to the base of a transistor 106, whose emitter is connected to the inverting input terminal of the amplifier 102 through a third reference voltage generator 108 formed of, for example, five diodes 110 to 114. The cathode of the diode 112 is connected to the collector of the transistor 106. The emitter of this transistor 106 is connected to the output terminal of the amplifier 102 through the emitter-base path of a pnp transistor 116 and a resistor 118. The transistor 116 is connected at its collector to the cathode of the diode 75. It should be noted that the circuit arrangement including the circuits 42, 56, 70, 72, 80 and 100 is basically formed into an integrated circuit which is encapsulated in a single IC package.

Figure 4A:
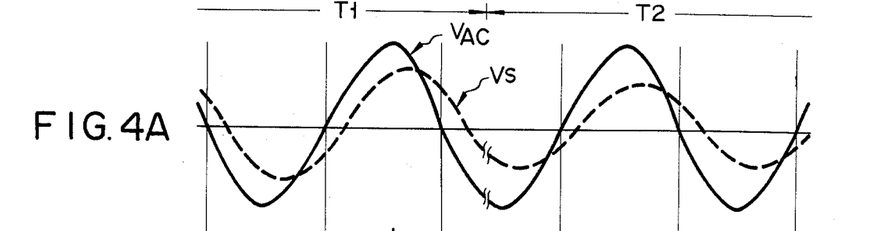
FIGS. 4A to 4H are timing charts, respectively, showing the voltage signals generated in the main part of the electric circuit shown in FIG. 1.
Figure 4B:
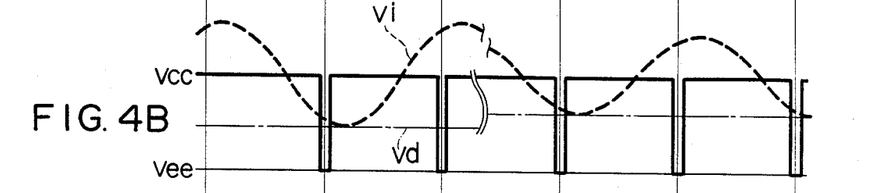

The operation mode of the first embodiment having the configuration described above will now be described. An AC voltage $V_{AC}$ having a waveform indicated by the solid curve in FIG. 4A is applied from the AC power source 20, so that a current flows through a series circuit of the variable resistor 22, the resistor 24, the impedance of the heat-sensitive layer 14c, the overheating sensor line 12d and the fuse heater 26. An AC detection voltage Vs having a waveform indicated by the dotted curve in FIG. 4A is generated across the conductors 14b and 14d of the sensor wire 14 in the blanket body 10 due to a voltage division by the heat-sensitive layer 14c. The voltage Vs is further divided by the voltage divider 28 so as to produce a temperature detection voltage Vi having a waveform indicated by the dotted curve in FIG. 4B. The voltage Vi is supplied to the non-inverting input terminal of the operational amplifier 44 included in the temperature detector 42. These voltages Vs and Vi vary in accordance with a variation in temperature of the blanket body 10 itself of the electric blanket. (Because the impedance of the heat-sensitive layer 14c varies in response to a variation in temperature of the blanket body 10.) The detection voltage Vi is buffer-amplified by the operational amplifier 44 in the temperature detector 42 and is rectified by the diode 54. Furthermore, the rectified voltage is smoothed by the capacitor 46 and is converted to a DC temperature detection signal Sd (having a voltage waveform Vd indicated by the dash-dot line in FIG. 4B) representing the temperature of the blanket body 10. This signal Sd is supplied to the non-inverting input terminals of the three amplifiers 70, 80 and 102.

Figure 5A:
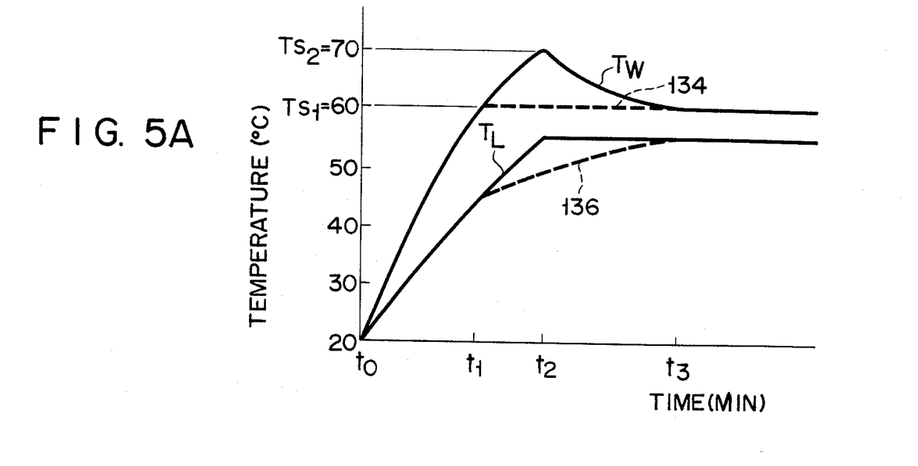
FIG. 5A is a graph for explaining a change in temperature of the electric blanket (FIG. 1) as a function of time.
Figure 6A:
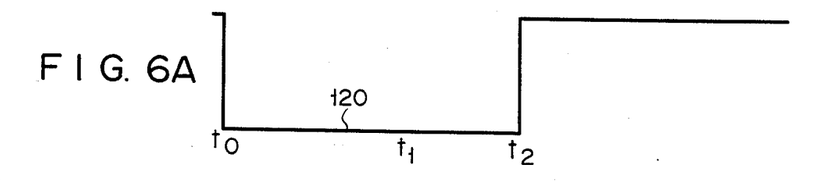
FIGS. 6A to 6C are timing charts, respectively, for explaining the mode of operation of a reference temperature correction circuit arranged in the electric blanket shown in FIG. 1.
Figure 6B:
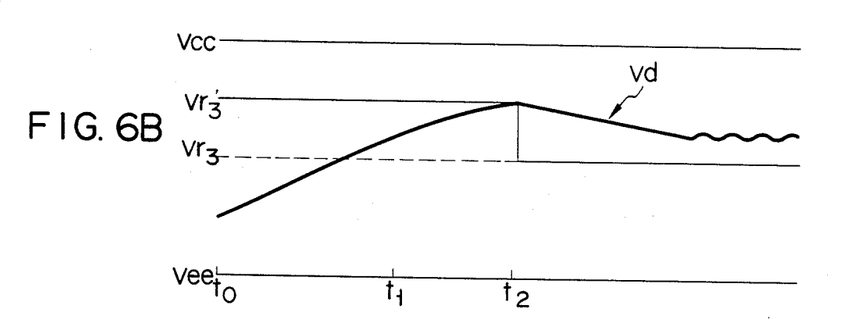
Figure 6C:
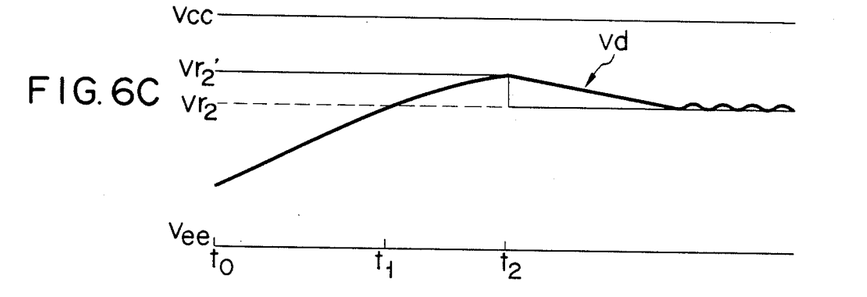

It should be noted that a temperature $T_L$ of the blanket body 10 and a wire temperature $T_W$ of the heater wire 12 detected by the sensor wire 14 are both equal to room temperature (e.g., 20° C.) as shown in FIG. 5A immediately after the AC power source voltage $V_{AC}$ is applied to the electric blanket at time $t_0$. Therefore, in the reference voltage adjusting circuit 100, the operational amplifier 102 receives the potential Vd of the detection signal Sd from the temperature detector 42 and generates a signal of low level indicated by a reference numeral 120 in FIG. 6A. Then, the transistor 106 is rendered conductive to cause the cathode of the diode 112 among the diodes 110 to 112 of the third reference voltage generator 108 to short-circuit at the potential Vcc of a line L4. As a result, a third reference voltage $Vr_3$ ($=Vcc-5 \cdot V_D$, where $V_D$ is the contact potential drop of each diode; see FIG. 6B) supplied from the third reference voltage generator 108 to the inverting input terminal of the operational amplifier 102 is increased to a new reference voltage $Vr_3'$ ($=V_{cc}-2 \cdot V_D > V_{r3}$) which is lower than the potential $V_{cc}$ of the line L4 by a sum $2 \cdot V_D$ of contact potential drops of the two diodes 113 and 114 only. The reference voltage $V_{r3}'$ will be referred to as an adjusted (corrected) third reference voltage hereinafter. The transistor 116 connected to the amplifier 102 is rendered conductive. Therefore, the potential at the common junction (or the anode of the diode 76) between the diodes 75 and 76 of the second reference voltage generator 74 included in the gate circuit 72 becomes substantially the same as the potential $V_{cc}$. Therefore, a second reference voltage $V_{r2}$ ($=V_{cc}-3 \cdot V_D$; see FIG. 6C) supplied from the second reference voltage generator 74 to the inverting input terminal of the amplifier 80 is increased to a new reference voltage $V_{r2}'$ which is lower than the potential $V_{cc}$ at the line L1 by a sum $2 \cdot V_D$ of the contact potential drops of the two diodes 76 and 77 only. The voltage $V_{r2}'$ will be referred to as a corrected second reference voltage hereinafter. It should be noted that the corrected second reference voltage $V_{r2}'$ is higher than the normal reference voltage $V_{r2}$ by the contact potential drop $V_D$ of the single diode 75 equivalently removed from the circuit configuration. An increase in the reference voltage corresponds to a difference (10° C., for example) in temperature between a normal reference temperature $T_{s1}$ ($=60°$ C., for example) and an adjusted reference temperature $T_{s2}$ ($=70°$ C.), as is apparent from FIG. 5A, when the voltage change is converted to a temperature change. When the user uses the electric blanket, the target temperature $T_s$ at which the heater wire 12 in the blanket body 10 is to be deenergized is temporarily adjusted or changed to the temperature $T_{s2}$ ($=70°$ C.) higher than the temperature $T_{s1}$ ($=60°$ C.) by 10° C.

Figure 4C:
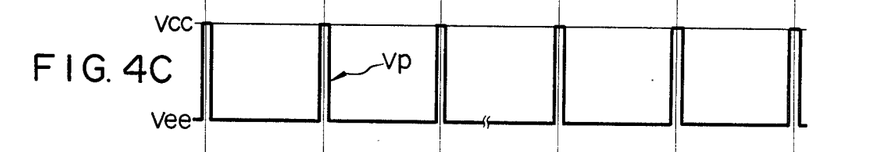
Figure 4D:
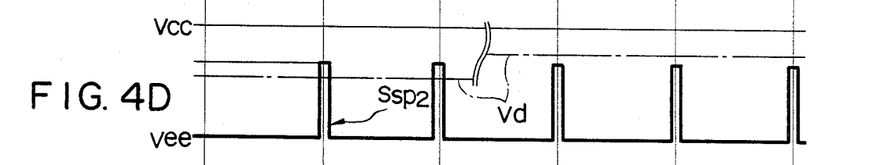

Under this condition, the synchronous circuit 41 produces a sync pulse signal Sp whose logic level varies at the zero-crossing. The voltage waveform Vp of this signal Sp is illustrated in FIG. 4C. The sync pulse signal Sp is supplied to the base of the switching transistor 64 included in the gate circuit 56 through a signal line L3 and the resistor 66. The transistor 64 performs its switching operation in response to the sync pulse signal Sp. When the signal Sp is set at high a potential level, the transistor 64 is rendered, conductive and the base potential thereof drops to a low potential level. Therefore, a current flows in the zener diode 60 of the first reference voltage generator 58. Therefore, the anode potential of the zener diode 60 is kept at a first reference voltage $V_{r1}$ ($V_{r1}=V_{cc}-V_{ZD}$), which is supplied to the inverting input terminal of the amplifier 70, and which is lower than the potential $V_{cc}$ of the line L1 by the zener voltage $V_{ZD}$ (e.g., about 4.9 V). However, when the signal Sp is set at a low potential level, the transistor 64 is rendered nonconductive, so that a current flows from the line L1 through the resistor 68 to the inverting input terminal of the amplifier 70. Therefore, the inverting input potential at the amplifier 70 becomes substantially equal to the high potential level ($=V_{cc}$). As a result, a sampling output signal $Ssp_1$ from the gate circuit 56 operated in response to the sync pulse signal Sp has a waveform V1 indicated by the solid line in FIG. 4B. The amplifier 70 receives the detection signal Sd at the non-inverting input terminal thereof and the sampling signal $Ssp_1$ at the inverting input terminal thereof to compare the two signals. It should be noted that the detection signal Sd from the temperature detector 42 is set to be higher than the first reference voltage $V_{r1}$ generated by the first reference voltage generator 58 even if the temperature of the blanket body 10 of the electric blanket is as low as room temperature. Therefore, when the sampling signal potential V1 has the same potential as the reference voltage $V_{r1}$ (i e., when the AC voltage $V_{AC}$ crosses zero potential), the operational amplifier 70 is rendered nonoperative (generation of a low level signal). Otherwise (V1>Vd), the operational amplifier 70 is rendered operative (generation of a high level signal).

Figure 4E:
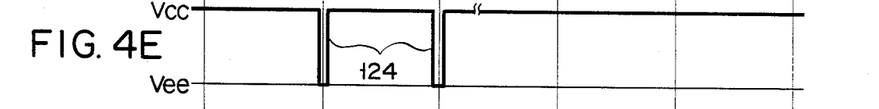
Figure 4F:
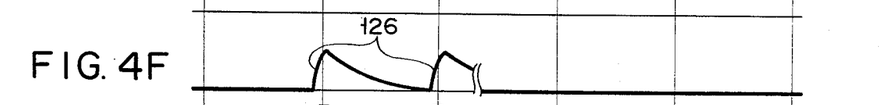
Figures 4G, 4H:
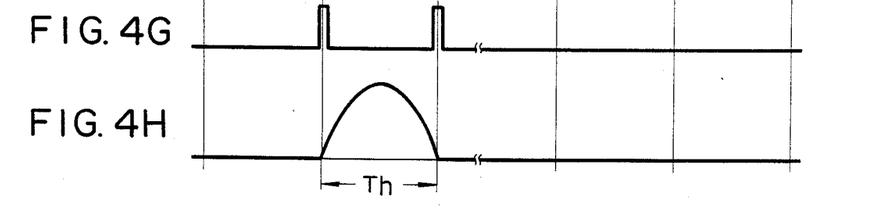

In response to the output signal or comparison signal from the operational amplifier 70, the gate circuit 72 supplies the inverting input terminal of the operational amplifier 80 with a sampling signal $Ssp_2$ which has a high level equal to the level of the corrected second reference voltage $V_{r2}'$ when the AC voltage $V_{AC}$ crosses zero potential, and which has a low level equal to the level of the voltage Vee when the AC voltage $V_{AC}$ does not cross zero potential. The operational amplifier 80 compares the signal $Ssp_2$ with the detection signal Sd supplied to the non-inverting input terminal thereof. When the voltage Vd of the detection signal Sd is lower than the corrected second reference voltage $V_{r2}'$ during a period T1 (FIG. 4), the amplifier 80 generates an output signal So having pulse components indicated by reference numeral 124 lowered to the low voltage Vee at the zero crossing points of the AC power source voltage $V_{AC}$, as shown in FIG. 4E. The output signal So is supplied to the base of the transistor 84 through the resistor 82. Therefore, only when the signal So has the Vee potential level, is the transistor 84 rendered conductive, and a terminal voltage Vc of the capacitor 88 connected to the collector of the transistor 84 rises, as indicated by reference numeral 126 in FIG. 4F. In this case, the voltage applied to the gate of the thyristor 16 changes in a pulsed manner in synchronism with the AC power source voltage $V_{AC}$, as shown in FIG. 4G. The charge on the capacitor 88 flows as a gate current Ig to the thyristor 16. As a result, since the thyristor 16 is rendered conductive only during a positive half cycle period (a forward bias period in which the thyristor 16 is forward-biased) Th (FIG. 4G) of the AC power source voltage $V_{AC}$, the AC power source voltage $V_{AC}$ is permitted to be applied across the heating line 12b, as shown in FIG. 4H. Therefore, the heating line 12b is energized to heat the blanket body 10 only during the period Th.

Figure 5B:
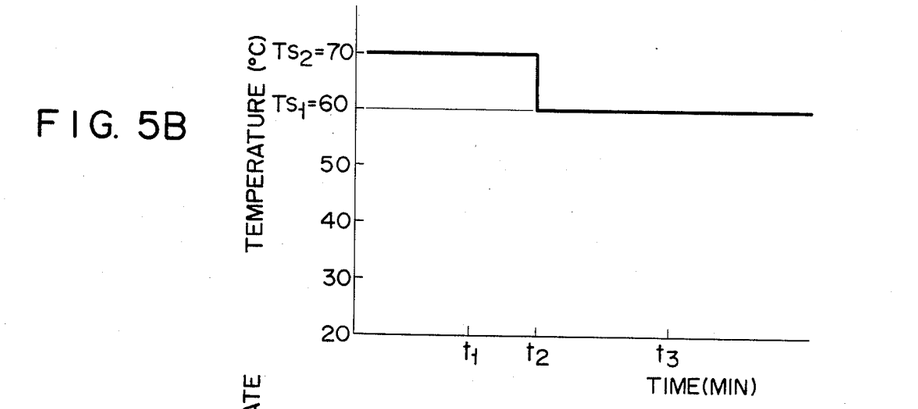
FIG. 5B is a graph for explaining a change in reference temperature of the electric blanket (FIG. 1) after correction as a function of time.

The above-mentioned heating operation is repeated to increase the temperature of the blanket body 10. A wire temperature $T_W$ detected by the temperature sensor wire 14 reaches the normal reference temperature $T_{s1}$ ($=60°$ C.) at time $t_1$, as shown in FIG. 5A. However, at the moment when the electric blanket is started to be operative, the reference temperature concerning temperature control is adjusted to be $T_{s2}$ ($>T_{s1}$). Therefore, the AC power source voltage $V_{AC}$ continues to be supplied to the heating line 12b in the same manner as described above. Therefore, a detection temperature $T_L$ of the blanket body 10 continues to rise after time $t_1$. The power supply to the heating line 12b is prevented when the wire temperature $T_W$ has reached the adjusted reference temperature $T_{s2}$ at time $t_2$. In other words, when the temperature $T_W$ exceeds the adjusted reference temperature $T_{s2}$ at time $t_2$, the potential Vd of the detection signal Sd exceeds both the second and third connected reference voltages $V_{r2}'$ and $V_{r3}'$. Therefore, the operational amplifiers 80 and 102 generate output signals of high level, respectively. As a result, in the temperature adjusting circuit 100, the transistors 106 and 116 are rendered nonconductive. Therefore, a current flows in all the diodes 110 to 114. The voltage applied to the inverting input terminal of the differential amplifier 102 becomes a voltage (Vcc−5·$V_D$). The reference voltage for the operational amplifier 102 is lowered from the corrected third reference voltage $Vr_3'$ (=Vcc−2·$V_D$) to the lower normal third reference voltage $Vr_3$ (=Vcc−5·$V_D$). On the other hand, in the second reference voltage generator 74 in the gate circuit 72, in response to the switching operation wherein the transistor 116 is rendered nonconductive, a current flows from the signal line L1 to the diodes 75 to 77. Therefore, a voltage applied to the inverting input terminal of the operational amplifier 80 becomes a voltage (Vcc−3·$V_D$). In other words, the reference voltage for the amplifier 80 is lowered from the corrected second reference voltage $Vr_2'$ (=Vcc−2·$V_D$) to the normal second reference voltage $Vr_2$ (Vcc−3·$V_D$). Therefore, after time $t_2$, the heating line 12b is energized/deenergized in accordance with the normal reference temperature $Ts_1$. FIG. 5B shows a variation in this reference temperature. Under this condition, the pulse peak of the sampling signal $Ssp_2$ (FIG. 4D) supplied to the inverting input terminal of the operational amplifier 80 is, of course, equal to the normal second reference voltage $Vr_2$ ($<Vr_2'$). After time $t_2$, the second reference voltage $Vr_2$ is used as a new target value. When the detection signal potential Vd becomes lower than the voltage $Vr_2$ (corresponding to the period T1), the thyristor 16 is turned on during the period Th shown in FIG. 4H so as to energize the heating line 12b. However, when the detection signal potential Vd becomes higher than the voltage $Vr_2$ (corresponding to the period T2), the thyristor 16 is turned off, thereby deenergizing the heating line 12b. In other words, after time $t_2$, the heating line 12b is controlled such that the wire temperature $T_W$ is kept at the normal reference temperature $Ts_1$. More particularly, when the detection voltage Vd becomes lower than the second reference voltage $Vr_2$, the thyristor 16 is turned on in response to the transistor 84 which is turned on in response to the comparison output signal from the operational amplifier 80, thereby immediately energizing the heating line 12b. Therefore, the voltage Vd will never drop lower than the third reference voltage $Vr_3$ after time $t_2$.

Figure 5C:
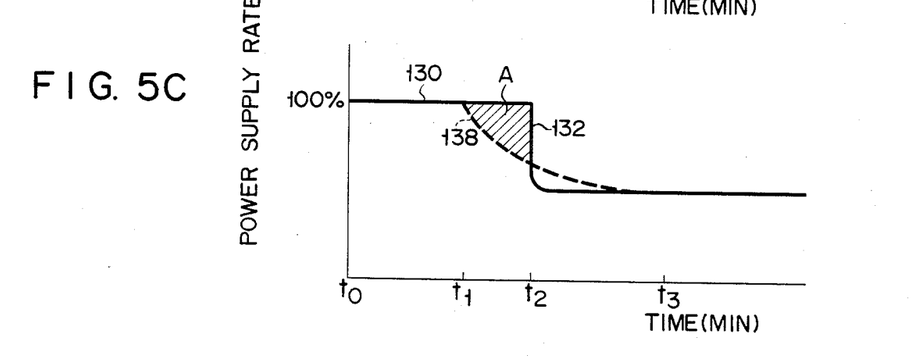
FIG. 5C is a graph for explaining a change in power supply rate of the electric blanket (FIG. 1) as a function of time.

According to the temperature controller having the configuration of the first embodiment, the user turns on a power switch and adjusts the variable resistor 22 so as to preset the temperature. Basically, the heater wire 12 is deenergized when the temperature (detected by the sensor wire 14) of the heater wire 12 arranged in the electric blanket has reached the desired preset temperature corresponding to the first reference temperature $Ts_1$, while the heater wire 12 is energized when the temperature of the heater wire 12 falls below the reference temperature $Ts_1$, thereby repeating temperature control and causing the electric blanket to maintain the preset temperature. In addition to the basic temperature control according to the present invention, the reference temperature at which the heater wire 12 is deenergized is automatically and temporarily corrected from the first reference temperature $Ts_1$ to a second reference temperature $Ts_2$ which is higher by a predetermined temperature, only during the period immediately after the electric blanket is turned on when the blanket temperature is low. Therefore, the heater wire 12 of the blanket 10 remains energized as shown by reference numeral 130 in FIG. 5C even when the wire temperature $T_W$ has reached the first reference temperature (normal reference temperature) $Ts_1$ at time $t_1$ as shown in FIG. 5A. Therefore, the temperature $T_L$ of the blanket body 10 itself, which is lower than that of the heater wire 12 due to the heat-insulating characteristic, rises quickly, as shown in FIG. 5A. Therefore, the temperature of the electric blanket smoothly and rapidly rises to the desired preset temperature. Thereafter, at time $t_2$, the reference temperature changes from the second, corrected reference temperature $Ts_2$ to the first, normal reference temperature $Ts_1$ as shown in FIG. 5B when the wire temperature $T_W$ has reached the adjusted reference temperature $Ts_2$. Therefore, the heater wire 12 is deenergized, as shown by reference numeral 132 in FIG. 5C. According to the present invention, in the initial period of use of the electric blanket, the time interval required for the blanket temperature to reach the preset temperature is greatly shortened. The increase in the heater wire temperature $T_W$ and the blanket temperature $T_L$ are indicated by dotted lines 134 and 136 in FIG. 5A, respectively. In the conventional temperature control apparatus, the heater wire 12 is simply deenergized when the wire temperature $T_W$ has reached the first reference temperature $Ts_1$ (power supply is reduced as indicated by the dotted curve 138 in FIG. 5C). Therefore, the rise in the blanket temperature $T_L$ is much less than the desired preset temperature, so that the temperature rise is as indicated by reference numeral 136 in FIG. 5A. Therefore, an extremely long time interval between $t_0$ and $t_3$ (only the time interval between $t_0$ and $t_2$ in this embodiment) is required to raise the blanket temperature to the preset temperature. According to the present invention, the power supplied to the heater wire 12 of the electric blanket is increased by a difference corresponding to a hatched area A in FIG. 5C between times t1 and t2, as compared with the power supplied in the conventional apparatus. This difference is the key in raising the actual electric blanket temperature to the desired preset temperature.

Furthermore, according to the present invention, the reference temperature to be corrected is not the blanket temperature $T_L$ but the wire temperature $T_W$. Therefore, even when the above-mentioned temperature adjustment is performed, the blanket will not overheat. This is because the blanket temperature $T_L$, which tends to be lower than the wire temperature $T_W$, does not greatly exceed the desired temperature preset by the user since the blanket body has a poor heat conduction characteristic in favor of its heat-retaining function. The above-mentioned temperature correction is effected by an operation wherein the blanket temperature $T_L$ is increased to reach the desired preset temperature in a short period of time. Therefore, according to the present invention, the user need not worry about an overheated blanket.

In addition to the above advantages of the present invention, even if the user sets the electric blanket to a maximum temperature, the blanket temperature $T_L$ can reach the desired preset temperature in a shorter period of time according to the above-mentioned temperature correction. The desired temperature of an electric blanket can always be attained with a shorter time period irrespective of its initial temperature set level.

Figure 7:
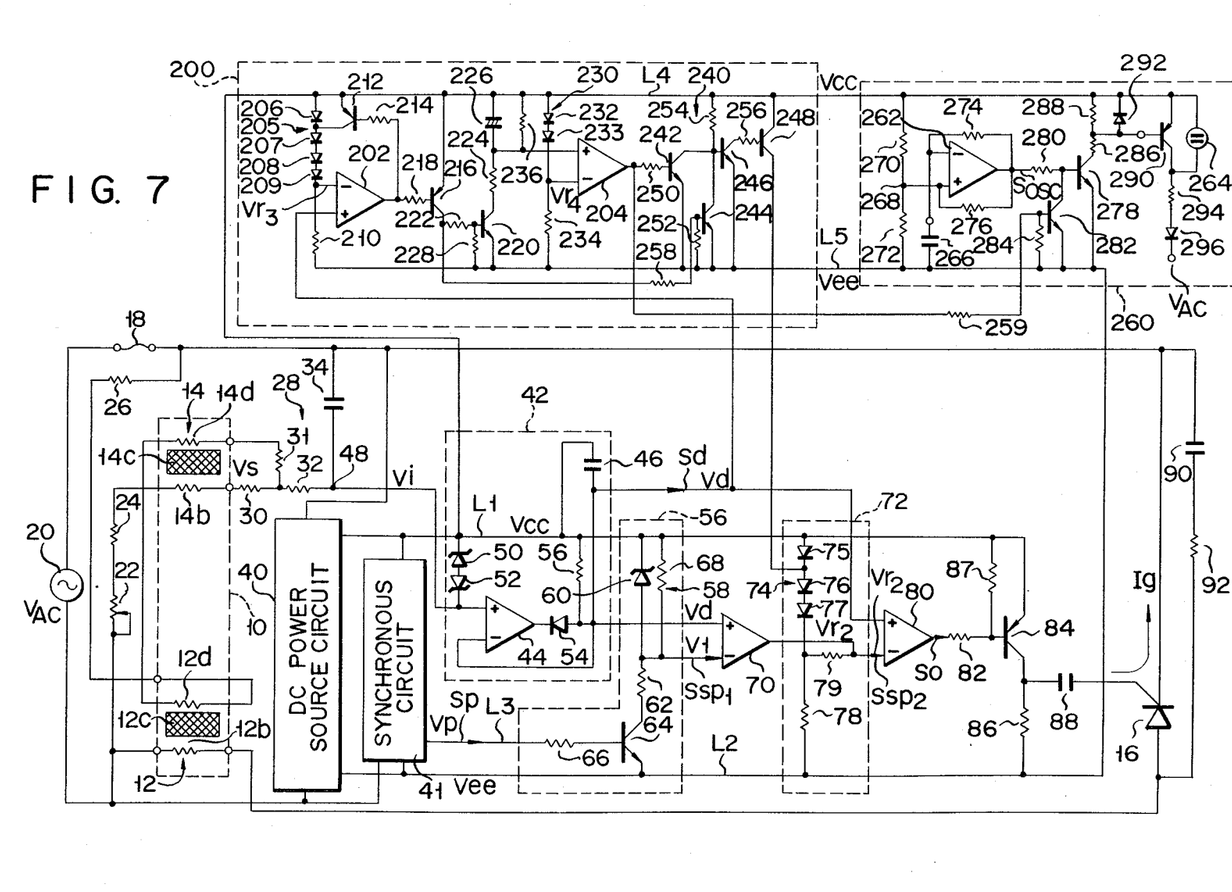
FIG. 7 is a circuit diagram of an electric blanket according to a second embodiment of the present invention.

FIG. 7 shows the circuit configuration of an electric blanket according to a second embodiment of the present invention. The same reference numerals as used in FIG. 1 denote the same parts in FIG. 7, and a detailed description thereof will be omitted.

A timer circuit 200 including two operational amplifiers 202 and 204 is connected to a temperature detector 42 and a gate circuit 72. The amplifier 202 has its inverting input terminal connected to a line L4 through a third reference voltage generator 205 which includes four series-connected diodes 206 to 209, and connected through a resistor 210 to a line L5 the potential of which is Vee. The amplifier 202 receives a temperature detection signal Sd at the non-inverting input terminal thereof. A switching pnp transistor 212 is connected at its base to the output terminal of the amplifier 202 through a resistor 214. The emitter and collector of the transistor 212 are connected to the anode and cathode of the diode 206, respectively. A pnp transistor 216 is provided to have its base connected to the output terminal of the amplifier 202 through a resistor 218, its emitter connected to the line L4, and its collector connected to the base of an npn transistor 220 through a resistor 222. The emitter of the transistor 220 is connected to the line L5, while the collector thereof is connected to the line L4 through a resistor 224 and a capacitor 226. The base and emitter of the transistor 220 are connected to each other through a resistor 228.

In the circuit 200, the inverting input terminal of the other amplifier 204 is connected to the line L4 through a fourth reference voltage generator 230 having two series-connected diodes 232 and 233, and connected to the line L5 through a resistor 234. The noninverting input terminal of the amplifier 204 is connected to the common junction between the resistor 24 and the capacitor 226 with which a resistor 236 is connected in parallel. The resistor 224 and the capacitor 226 serve as components to constitute an RC timer in cooperation with the operational amplifier 204. The output terminal of the amplifier 204 is connected to a preset temperature adjusting circuit 240 which includes four transistors 242, 244, 246 and 248, and resistors 250, 252, 254 and 256, which have the configuration shown in FIG. 7. The base of the transistor 244 is connected to the collector of the transistor 216 through a resistor 258. The collector of the transistor 248 is connected to the anode-cathode common junction between diodes 75 and 76 included in a gate circuit 72.

The output terminal of the RC timer (i.e., the output terminal of the amplifier 204) is connected through a resistor 259 to a display circuit 260 including an operational amplifier 262 serving as an oscillator and a display element such as a neon lamp 264. The inverting input terminal of the amplifier 262 is connected to the line L5 through a capacitor 266, while the non-inverting input terminal thereof is connected to a common junction 268 of a series circuit of two resistors 270 and 272 connected between the lines L4 and L5. The output of the amplifier 262 is fed-back to the inverting and non-inverting input terminals thereof through resistors 274 and 276, respectively. The output terminal of the amplifier 262 is connected to the base of an npn transistor 278 and to the collector of another npn transistor 282 through a resistor 280. The transistor 282 has its emitter connected to the line L5, and its base, which is connected to the output terminal of the amplifier 204 included in the timer circuit 200 through the resistor 260, and which is also connected to the line L5 through a resistor 284. The transistor 278 has its emitter connected to the line L5 and its collector connected to the line L4 through resistors 286 and 288. A pnp transistor 290 connected in parallel with the lamp 264 has its base connected to the common junction between the resistors 286 and 288. A diode 292 is connected in parallel with the base-emitter path of the transistor 290. The collector of the transistor 290 is connected to an AC power source 20 through a resistor 294 and a diode 296.

Figure 8A:
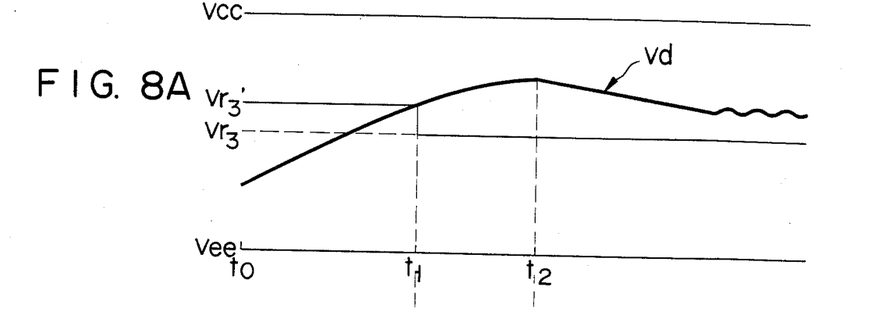
FIGS. 8A to 8F are timing charts, respectively, of voltage signals generated in the main part of the circuit shown in FIG. 7.
Figure 8B:
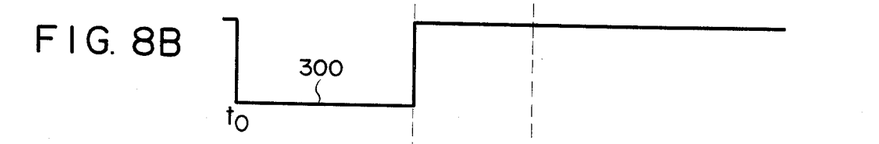
Figure 8C:
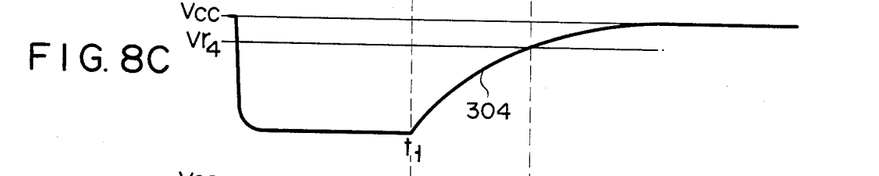
Figure 8D:
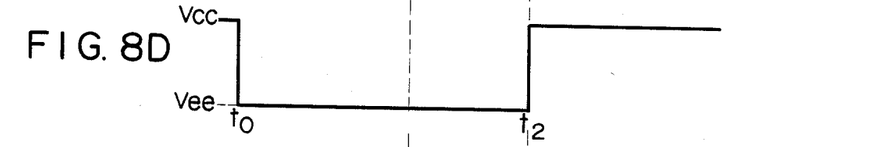
Figure 8E:
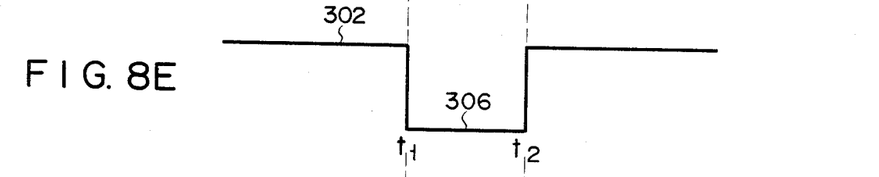

The operation mode of the second embodiment having the above configuration including the timer circuit 200 and the display circuit 262 will now be described. In the initial period after the electric blanket is turned on, the temperature $T_L$ of the blanket 10 is as low as the room temperature as previously described, so that the operational amplifier 202 has an output signal at a low level denoted by reference numeral 300 in FIG. 8B. The switching transistor 212 is rendered conductive, so that both ends of the diode 206 of the third reference voltage generator 205 are short-circuited. The reference voltage to be supplied to the inverting input terminal of the amplifier 202 is increased from a voltage $Vr_3$ ($=Vcc-4\cdot V_D$) to a voltage $Vr_3'(=Vcc-3\cdot V_D>Vr_3)$. At the same time, the transistors 216 and 220 are rendered conductive in response to the low level signal from the operational amplifier 202, so that the capacitor 226 is charged through the resistor 224. A terminal voltage across the capacitor 226 changes, as shown in FIG. 8C. The terminal voltage across the capacitor 226 becomes lower than a fourth reference voltage $Vr_4$ ($=Vcc-2\cdot V_D$) of the amplifier 204 immediately after time $t_0$, so that the output signal from the operational amplifier 204 goes to a low level. The transistor 242 is thus rendered nonconductive. However, in response to the ON state of the transistor 216, the transistor 244 is rendered conductive and thus the transistor 246 is rendered nonconductive. As a result, the collector potential of the transistor 246 has a high level as designated by reference numeral 302 in FIG. 8E, so that the transistor 248 is rendered nonconductive.

Figure 8F:
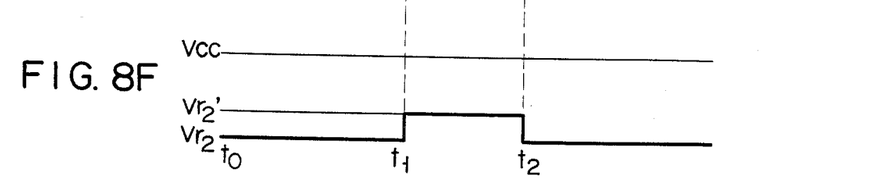

Thereafter, at time $t_1$, the potential Vd of a temperature detection signal Sd corresponding to the increasing heater-sensor temperature $T_W$ becomes higher than the third reference voltage $Vr_3'$ ($=Vcc-3\cdot V_D$), and the operational amplifier 202 generates a high level signal. In response to this high level signal, the transistors 212, 216 and 220 are rendered nonconductive. At this time, the third reference voltage supplied to the operational amplifier 202 is decreased to the potential $Vr_3$ ($=Vcc-4\cdot V_D>Vr_3'$), as shown in FIG. 8A. At the same time, charging of the capacitor 226 is prevented, so that a charging current flows through the resistor 236. Therefore, the terminal voltage across the capacitor 226 is increased toward the potential Vcc, as designated by reference numeral 304 in FIG. 8C. On the other hand, the transistor 244 connected to the transistor 216 is turned off in response to the OFF state of the transistor 216. Subsequently, the transistor 246 is turned on, and the collector potential thereof is set at a low level as designated by reference numeral 306 in FIG. 8E. Therefore, the transistor 248 is rendered conductive to cause the anode of a diode 76 of a second reference voltage generator 74 to have the potential Vcc. As a result, the second reference voltage of an operational amplifier 80 is increased from the voltage $Vr_2$ ($=Vcc-3\cdot V_D$) to the voltage $Vr_2'$ ($=Vcc-2\cdot V_D>Vr_2$), as shown in FIG. 8F. In other words, the reference temperature for the sensor wire temperature $T_W$ is temporarily increased from the normal reference temperature $Ts_1$ (as described with reference to FIG. 5A) to the adjusted reference temperature $Ts_2$ after time $t_1$.

Thereafter, at time $t_2$, when the sensor wire temperature $T_W$ has reached the adjusted (corrected) reference temperature $T_{S2}$, the terminal voltage across the capacitor 226 becomes higher than the fourth reference voltage $V_{r4}$ ($=V_{cc}-2\cdot V_D$), so that the output from the operational amplifier 204 is set at a high level. In response to this high level signal, the transistor 248 is rendered nonconductive in the same manner as described above, thereby setting again the second reference voltage for the operational amplifier 80 to the potential $V_{r2}$ ($=V_{cc}-3\cdot V_D$) obtained by subtracting the sum of the contact potential drops across the three series-connected diodes 75 to 77, as shown in FIG. 8F. Therefore, after time $t_2$, the heater wire 12 is controlled using the normal reference temperature $T_{S1}$ in the same manner as in the first embodiment as previously described.

Finally, the operation mode of the display circuit 260 will be described. The transistor 282 performs a switching operation in response to the comparison signal from the operational amplifier 204. During the time interval between $t_0$ and $t_2$, the transistor 282 is rendered nonconductive. The transistor 278 repeats the ON/OFF operation in response to an oscillation signal $S_{osc}$ generated from the operational amplifier 262 at a predetermined oscillation period. When the transistor 278 is kept ON, the transistor 290 is kept ON, thereby deenergizing the lamp 264. However, when the transistor 278 is kept OFF, the lamp 264 is kept ON. Therefore, the user can know that the electric blanket is still in the fast heating mode in accordance with the ON/OFF state of the lamp 264. After time $t_2$, the transistor 282 is rendered conductive in response to the operational amplifier 204, so that the transistors 278 and 290 are rendered continuously nonconductive, whereby the ON state of the lamp 264 is permitted. Therefore, the user can readily know, in accordance with the ON state of the lamp 264, that the temperature of the electric blanket has reached the desired preset temperature and that the normal temperature control is now performed.

Although the present invention has been shown and described with respect to particular embodiments, various changes and modifications which are obvious to a person skilled in the art to which the invention pertains are deemed to lie within the spirit and scope of the invention.

In the above embodiments, the sensor wire 14 is arranged spaced apart from the heater wire 12. However, the present invention may be applied to a structure wherein the nylon layer 12c between the heating line 12b and the overheating sensor line 12d is used as a heat-sensitive layer 14c, and the heating line 12b is formed integrally with the sensor wire 14.

A triac device may be used as the switching element in place of the thyristor 16. Alternatively, the thyristor 16 may be used to drive a relay to interrupt power supply from the heating line 12b by means of the relay contact.

In the second embodiment, the second reference voltage is increased from the voltage $V_{r2}$ to the voltage $V_{r2}'$ during the time interval between $t_1$ and $t_2$. However, the output voltage of the operational amplifier 204 may be used to directly control the second reference voltage generator 74, thereby increasing the second reference voltage $V_{r2}$ only during the time interval between times $t_0$ and $t_2$.

In the second embodiment, the resistance of the resistor 224 is sufficiently smaller than that of the resistor 236 so as to charge the capacitor 226 (after time $t_0$) in a short period of time. However, the resistance of the resistor 236 may be increased to prolong the charge time of the capacitor 226. When a time interval for setting the temperature of the sensor wire 14 at the temperature $T_{S1}$ (between $t_0$ and $t_1$) is very short due to, for example, a high ambient temperature of the blanket body 10, the time interval between times $t_1$ and $t_2$ is shortened so as to prevent full charging of the capacitor 226. As a result, the temperature of the blanket body 10 will not exceed the preset temperature even temporarily.

Furthermore, in the second embodiment, the counting operation of the timing circuit 200 is started by the output signal from the operational amplifier 202. However, the operational amplifier 202 may be omitted, and the output signal from the operational amplifier 80 may be used to start counting.

What is claimed is:

1. A temperature control apparatus suitably applied to flat heating equipment which includes a flat heat-retaining member such as a blanket, a heater wire disposed inside said heat-retaining member, and a sensor wire arranged inside said heat-retaining member to generate heater temperature data corresponding to a temperature of said heater wire, said temperature control apparatus comprising:
   (a) first circuit means for selectively generating first data representing a first temperature corresponding to a desired target temperature of said heat-retaining member and second data representing a second temperature which is higher than the first temperature by a constant degree independently of the desired target temperature of said heat-retaining member;
   (b) second circuit means, connected to said sensor wire, for generating a temperature detection signal having a signal level corresponding to the heater temperature data;
   (c) third circuit means, connected to said first and second circuit means, for comparing the detection signal with one of the first and second data as reference temperature data, and for preventing power supply to said heater wire when the signal level of the temperature detection signal exceeds a level of the reference temperature data; and
   (d) fourth circuit means, connected to said first and second circuit means, for controlling said first circuit means so as to generate the second data in an initial period after said flat heating equipment becomes operative and to continuously generate the first data after said signal level of the detection signal has reached a level corresponding to the second temperature, said fourth circuit means automatically generating the first data in the initial period when the heater temperature data is higher than said desired target temperature of said heat-retaining member.

2. An apparatus according to claim 1, wherein said third circuit means includes:
   a first operational amplifier having a first input to which the temperature detection signal is supplied, a second input to which said one of the first and second data is supplied as the reference temperature data, and an output for generating a comparison signal obtained by comparison between the detection signal and the reference temperature data; and first switching means, connected to said heater wire and said first operational amplifier, for performing a switching operation in response to the comparison signal, thereby controlling energization of said heater wire.

3. An apparatus according to claim 2, wherein said first circuit means includes:

a first series circuit connected to said fourth circuit means and the second input of said first operational amplifier and having a plurality of diodes each of which has a given contact potential drop, said series circuit receiving a predetermined DC voltage and supplying as the first data to the second input of said first operational amplifier a voltage lower than the predetermined DC voltage by a sum of contact potential drops of said plurality of diodes.

4. An apparatus according to claim 3, wherein said fourth circuit means includes:

second switching means connected in parallel with at least one diode of said plurality of diodes connected in series with each other, for performing a switching operation so as to be rendered conductive during said initial period, thereby short-circuiting both ends of said at least one diode and substantially cancelling the contact potential drop of said at least one diode, whereby a voltage increased by the contact potential drop of said at least one diode so as to correspond to the second data is applied to the second input of said first operational amplifier.

5. An apparatus according to claim 4, wherein said second switching means is rendered nonconductive when the detection signal has the level corresponding to the second temperature, thereby causing said first series circuit to supply to the second input of said first operational amplifier a voltage which is lower than the predetermined DC voltage by the sum of the contact potential drops of said plurality of diodes and which corresponds to the first data.

6. An apparatus according to claim 5, wherein said fourth circuit means further includes:

a second operational amplifier having a first input to which the detection signal is supplied, a second input and an output connected to said second switching means;

a second series circuit connected to the second input of said second operational amplifier and having a plurality of diodes connected in series with each other, said second series circuit receiving the predetermined DC voltage; and third switching means connected to the output of said second operational amplifier and connected in parallel with a predetermined number of diodes among said plurality of diodes of said second series circuit, said third switching means performing a switching operation in response to said second operational amplifier.

7. An apparatus according to claim 1, wherein said fourth circuit means controls said first circuit means so as to generate the first data during a first time interval when the detection signal level indicates a temperature which is lower than the first temperature immediately after said heating equipment becomes operative, to generate the second data during a second time interval when the detection signal level indicates a temperature which is higher than the first temperature, and to generate the first data again during a third time interval after the detection signal level has reached a level corresponding to the second temperature represented by the second data.

8. An apparatus according to claim 7, wherein said third circuit means includes:

a first operational amplifier having a first input to which the temperature detection signal is supplied, a second input to which said one of the first and second data is supplied as the reference temperature data, and an output for generating a comparison signal obtained by comparison between the detection signal and the reference temperature data; and first switching means, connected to said heater wire and said first operational amplifier, for performing a switching operation in response to the comparison signal, thereby controlling energization of said heater wire.

9. An apparatus according to claim 8, wherein said first circuit means includes:

a first series circuit connected to said fourth circuit means and the second input of said first operational amplifier and having a plurality of diodes each of which has a given contact potential drop, said series circuit receiving a predetermined DC voltage and supplying as the first data to the second input of said first amplifier a voltage lower than the predetermined DC voltage by a sum of contact potential drops of said plurality of diodes.

10. An apparatus according to claim 9, wherein said fourth circuit means includes:

second switching means, connected in parallel with at least one diode of said plurality of diodes connected in series with each other, for performing a switching operation so as to be rendered conductive during the second time interval, thereby short-circuiting both ends of said at least one diode and substantially cancelling the contact potential drop of said at least one diode, whereby a voltage increased by the contact potential drop of said at least one diode so as to correspond to the second data is applied to the second input of said first operational amplifier.

11. An apparatus according to claim 10, wherein said second switching means is rendered nonconductive during the first and third time intervals, thereby causing said first series circuit to supply to the second input of said first operational amplifier a voltage which is lower than the predetermined DC voltage by the sum of the contact potential drops of said plurality of diodes and which corresponds to the first data.

12. An apparatus according to claim 11, wherein said fourth circuit means further includes:

a second operational amplifier having a first input to which the detection signal is supplied, a second input and an output connected to said second switching means;

a second series circuit connected to said second input terminal of said second operational amplifier and having a plurality of diodes connected in series with each other, said second series circuit receiving the predetermined DC voltage; and third switching means connected to the output of said second operational amplifier and connected in parallel with at least one of said plurality of diodes of said second series circuit, said third switching means performing a switching operation in response to said second operational amplifier.

13. An apparatus according to claim 12, wherein said fourth circuit means further includes:

detecting means, provided between the output of said second operational amplifier and said second series circuit, for detecting the second time interval from a moment when the increasing detection signal level becomes equal to the first data to another moment when the increasing detection signal level becomes equal to the second data, said detecting means having a third operational amplifier, a capacitor connected to said third operational amplifier, and a third series circuit connected to said third operational amplifier and having a plurality of diodes.

14. An apparatus according to claim 13, further comprising:

display circuit means, connected to said detecting means of said fourth circuit means, for setting a first display state during the first and second time intervals in response to said detecting means and a second display state after the third time interval.

* * * * *

UNITED STATES PATENT AND TRADEMARK OFFICE
CERTIFICATE OF CORRECTION

PATENT NO.  : 4,549,074

DATED       : October 22, 1985

INVENTOR(S) : Katsuharu MATSUO

It is certified that error appears in the above-identified patent and that said Letters Patent is hereby corrected as shown below:

On the Title page,

--Assignee:  Tokyo Shibaura Denki Kabushiki Kaisha, of Kawasaki, Japan--

Change Attorney, Agent or Firm to read

--CUSHMAN, DARBY & CUSHMAN--

Signed and Sealed this

Twenty-eighth Day of October, 1986

[SEAL]

*Attest:*

DONALD J. QUIGG

*Attesting Officer*       *Commissioner of Patents and Trademarks*